United States Patent [19]

Lee et al.

[11] Patent Number: 4,722,050
[45] Date of Patent: Jan. 26, 1988

[54] METHOD AND APPARATUS FOR FACILITATING INSTRUCTION PROCESSING OF A DIGITAL COMPUTER

[75] Inventors: Ruby B. Lee, Cupertino; Allen J. Baum; Russell Kao, both of Palo Alto, all of Calif.

[73] Assignee: Hewlett-Packard Company, Palo Alto, Calif.

[21] Appl. No.: 845,213

[22] Filed: Mar. 27, 1986

[51] Int. Cl.$^4$ .......................... G06F 13/00; G06F 9/30
[52] U.S. Cl. .................................................... 364/200
[58] Field of Search ... 364/200 MS File, 900 MS File

[56] References Cited

U.S. PATENT DOCUMENTS 4,437,149  3/1984  Pomerene et al. ................... 364/200
4,521,850  6/1985  Wilhite et al. ....................... 364/200

Primary Examiner—Thomas M. Heckler
Assistant Examiner—Rebecca L. Adams
Attorney, Agent, or Firm—Douglas L. Weller

[57] ABSTRACT

A computer having a cache memory and a main memory is provided with a transformation unit between the main memory and the cache memory so that at least a portion of an information unit retrieved from the main memory may be transformed during retrieval of the information (fetch) from a main memory and prior to storage in the cache memory (cache). In a specific embodiment, an instruction may be predecoded prior to storage in the cache memory. In another embodiment involving a branch instruction, the address of the target of the branch is calculated prior to storing in the instruction cache. The invention has advantages where a particular instruction is repetitively executed since a needed decode operation which has been partially performed previously need not be repeated with each execution of an instruction. Consequently, the latency time of each machine cycle may be reduced, and the overall efficiency of the computing system can be improved. If the architecture defines delayed branch instructions, such branch instructions may be executed in effectively zero machine cycles. This requires a wider bus and an additional register in the processor to allow the fetching of two instructions from the cache memory in the same cycle.

18 Claims, 7 Drawing Figures

METHOD AND APPARATUS FOR FACILITATING INSTRUCTION PROCESSING OF A DIGITAL COMPUTER

BACKGROUND OF THE INVENTION

This invention relates to digital computers having cache memories in which information is exchanged between a main memory and a high speed processor via a high speed cache. A cache memory is a small fast memory disposed between a slower main memory and a high speed processor. In the past, cache memories have been used to store frequently used portions of main memory for high speed access by an associated high speed processor. The cache memory has previously been intended only to contain an unmodified subset of the contents of a main memory. In other words the contents of the main memory and the cache memory have differed, if at all, only temporarily due to write operations performed by the processor to the cache memory. However, the operations are either immediately or eventually reflected in write operations to the main memory.

High performance processors such as parallel processors and reduced instruction set computer (RISC) processors have as a purpose the most rapid and efficient execution of predefined instructions. An instruction is a form of digital information defining an operation and the operands performed by a processor. The execution of an instruction is the carrying out of the operation by the processor. Decoding of an instruction involves the determining from bits of information defining the instruction which operation is to be performed on which operands. Decoding of an instruction is required to produce control bits which are the values provided to control points of the processor.

A finite amount of time is required to decode an instruction prior to the execution of instruction. In the case of branch instructions, a finite amount of time is required to compute the address of the target instruction. In the past, it has been necessary that the instruction cycle be sufficiently long to examine all the bits of an instruction in order to determine which operation is to be performed and which instruction is to be fetched next. Low performance computers, that is, computers in which all stages of instruction processing are performed sequentially with no overlap of stages between instructions, must be provided sufficient latency time to perform all portions of the instruction including the decoding of the instruction. In higher performance computers, such as a computer using a pipelined processor wherein stages of an instruction cycle may overlap, stages of an instruction which rely on the completion of the stage of a previous instruction must be delayed. This may result in interlocking the pipe and loss of usefulness of one or more machine cycles. What is needed is a technique for overcoming such an inefficiency.

SUMMARY OF THE INVENTION

According to the invention, in a computer having a cache memory, a main memory and a processor, a transformation logic element is provided between the main memory and the cache memory so that at least a portion of an information unit (data word or instruction) retrieved from the main memory can be transformed during retrieval of the information unit (fetch) from a main memory and prior to storage in the cache memory (cache). In a specific embodiment, an instruction may be predecoded prior to storage in the cache. In another embodiment involving a branch instruction, the address of the target of the branch is calculated prior to storing in the instruction cache. The invention has advantages where a particular instruction is repetitively executed since any needed decode operation which has been partially performed previously need not be repeated with each execution of an instruction. Consequently, the latency time of each instruction cycle can be reduced, the frequency of interlocking of the instruction processing pipe can be reduced, and the overall efficiency of the computing system can be improved.

The invention has numerous advantages. One of the advantages of the invention is a capability to speed up operations substantially. For example, branch instructions or data transformation processes can be executed effectively in less than one machine cycle.

If the architecture defines delayed branch instructions, that is, branch instructions where the instruction immediately following the branch instruction is also executed, and thus must include a related delay instruction, then this invention allows branch instructions to be executed in effectively zero machine cycles since the delay instruction may be executed during the machine cycle in which the branch instruction would normally be executed and while the target address instruction is being fetched from memory. This requires the additional mechanism of being able to fetch two instructions from the cache in the same cycle, rather than fetch one instruction from the cache in one cycle.

Other types of transformations on data and instructions stored in a main memory may also be performed prior to or in the process of storage in a cache which are within the spirit and scope of the invention. The invention will be better understood by reference to the following detailed description in conjunction with the accompanying figures.

DESCRIPTION OF SPECIFIC EMBODIMENTS

Figure 1:
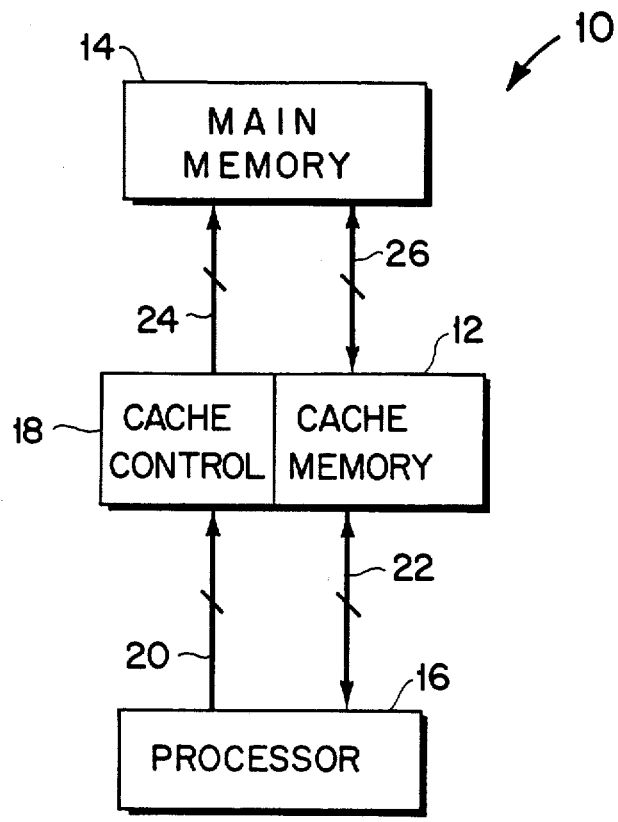
FIG. 1 is a block diagram of a portion of a conventional prior art computer apparatus with a cache memory.

Referring to FIG. 1 there is shown a portion of a conventional computer apparatus 10 of the prior art in which a cache memory 12 is employed. A main memory 14 is typically of the type which is very large and is constructed of components which are relatively economical but relatively slow in operation in comparison to the speed of operation of a processor 16. The cache memory (or cache) 12 is relatively fast and as a consequence is constructed of components which are relatively expensive. It has therefore been conventional to provide only a relatively small cache 12 to store a small portion of an exact image of the information stored in the main memory 14, namely, that portion of information from the main memory 14 calculated to be most likely to be needed by the processor 16.

Associated with the cache memory 12 is a cache controller 18. Its role includes the handling of requests via command and address lines 20 from the processor 16 for units of information in the form of units of data or instructions (e.g., bytes or words of data) and to cause the requested information to be transferred via data and instruction lines 22 from the cache memory 12 to the processor 16. In the event the cache 12 does not contain the requested information unit, the cache controller 18, via address lines 24, may retrieve (fetch) blocks of units of information from the main memory 14 to the cache 12, which would be transferred, unaltered, via data lines 26 to the cache 12.

Figure 2:
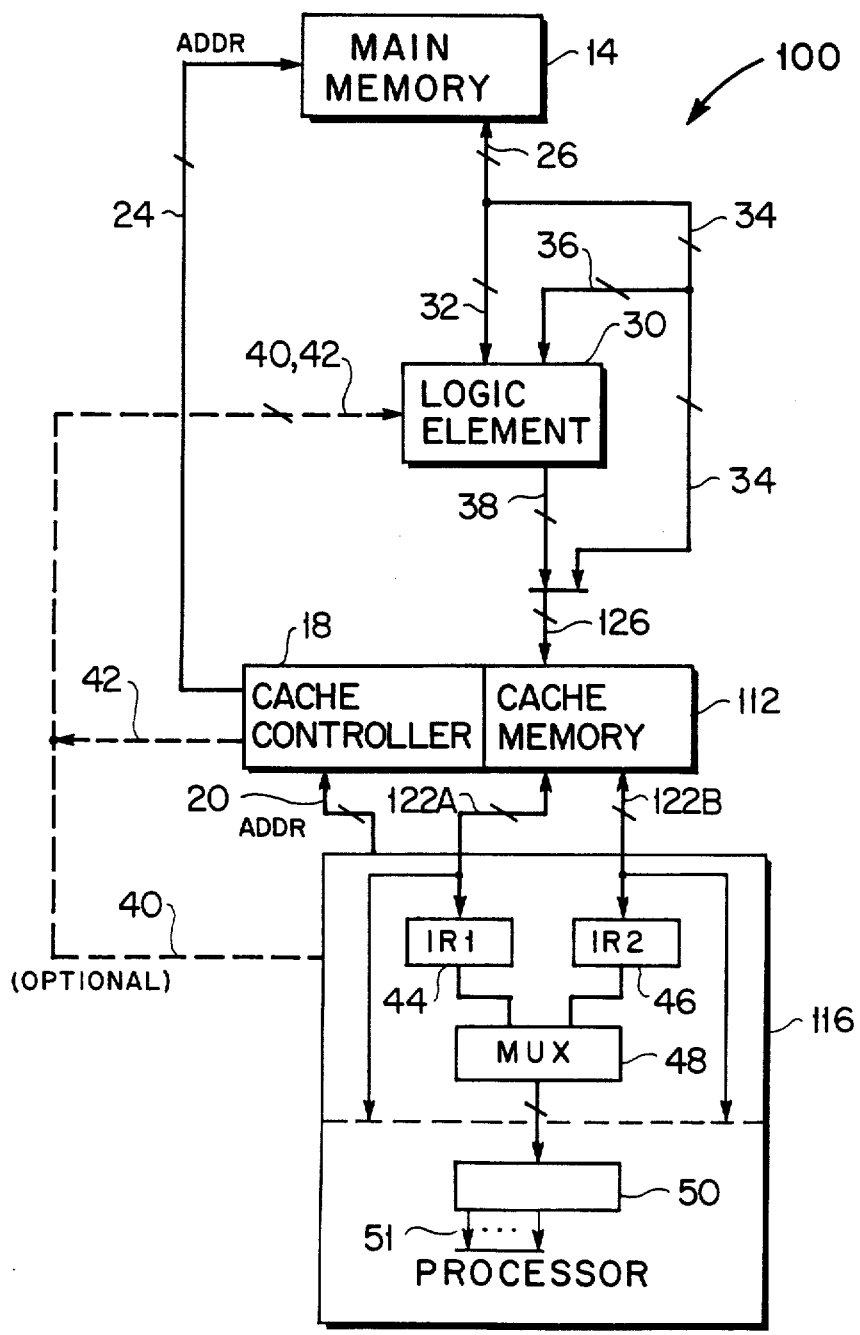
FIG. 2 is a block diagram illustrating one embodiment of a portion of a computer apparatus according to the invention.

Referring to FIG. 2 there is shown a portion of a computer system 100 illustrating one embodiment of the invention. Other embodiments will be apparent upon consideration of exemplary embodiments. For simplicity, the designations of elements which are identical or substantially identical to known or prior art elements are identified as in FIG. 1. According to the invention a logic element 30 is interposed between the main memory 14 and the cache memory 112 which functions to transform selected information units into a form more usable by a processor. Such transformed information units are stored in the cache 112 in a form suitable for recognition by a processor, such as processor 116.

The logic element 30 may be of the type which preprocesses instructions only or data only or instructions and data. The configuration shown in FIG. 2 is merely for generalized illustration purposes and may differ from actual implementations in detail. For illustration purposes the information unit lines 26 may include a first line set 32, which is routed to the logic element 30 and which is intended to carry a portion of an information unit to be transformed by the logic element 30, and a second line set 34, which is always routed unchanged to a cache 112. Of the second line set 34 a line set portion 36 may also be provided to the logic element 30 for processing that portion of an information unit carried by the first line set 32. The logic element 30 is coupled to the cache 112 through a third line set 38 which in combination with the second line set 34 define augmented information lines 126 into the cache 112.

Certain types of processes may be speeded if the cache memory 112 is provided with facilities for passing simultaneously more than one information unit to a processor. There is thus illustrated a cache 112 having two parallel information unit paths to a processor 116 which has been modified to receive information units simultaneously. It is assumed that the processor 116 can process only one information unit at a time. As illustration of this optional configuration the processor 116 shows a first information unit register (IR1) 44 and a second information unit register (IR2) 46 coupled to receive information units respectively via first information line 122A and second information line 122B, and a multiplexer (MUX) 48 which can select between IR1 44 and IR2 46 to direct the selected information unit through the processor 116 in the prior conventional fashion, as represented by a target location 50.

A still further generalized option is illustrated in connection with FIG. 2. Optional control lines 40 may be provided directly between the processor 116 and and the logic element 30, in the event the logic element 30 is a transformation unit having multiple functions. For example, the logic element 30 may be a unit capable only of predecoding operation codes (hereinafter opcodes), or it may be a unit capable only of computing instruction addresses. The type of predecoding or calculating thus required of the logic element 30 would therefore be inherent to the information unit supplied to it in response to a general fetch instruction issued in due course by the cache controller 18 to the main memory 14. However, in a more generalized implementation, it may be necessary that the processor give further directions to the logic element 30, wherein the logic element is informed of the type of information unit which is to be expected in the context of the fetch from a particular location. For example, the logic element may need to know whether the information unit at a particular address is to be treated in context as a data word or as an instruction, and if so the type of instruction. Provision must therefore be made to fetch an unmodified instruction from the main memory 14 whenever the information at a location in main memory is to be treated as data (i.e., information to be acted upon by an instruction).

Figure 3:
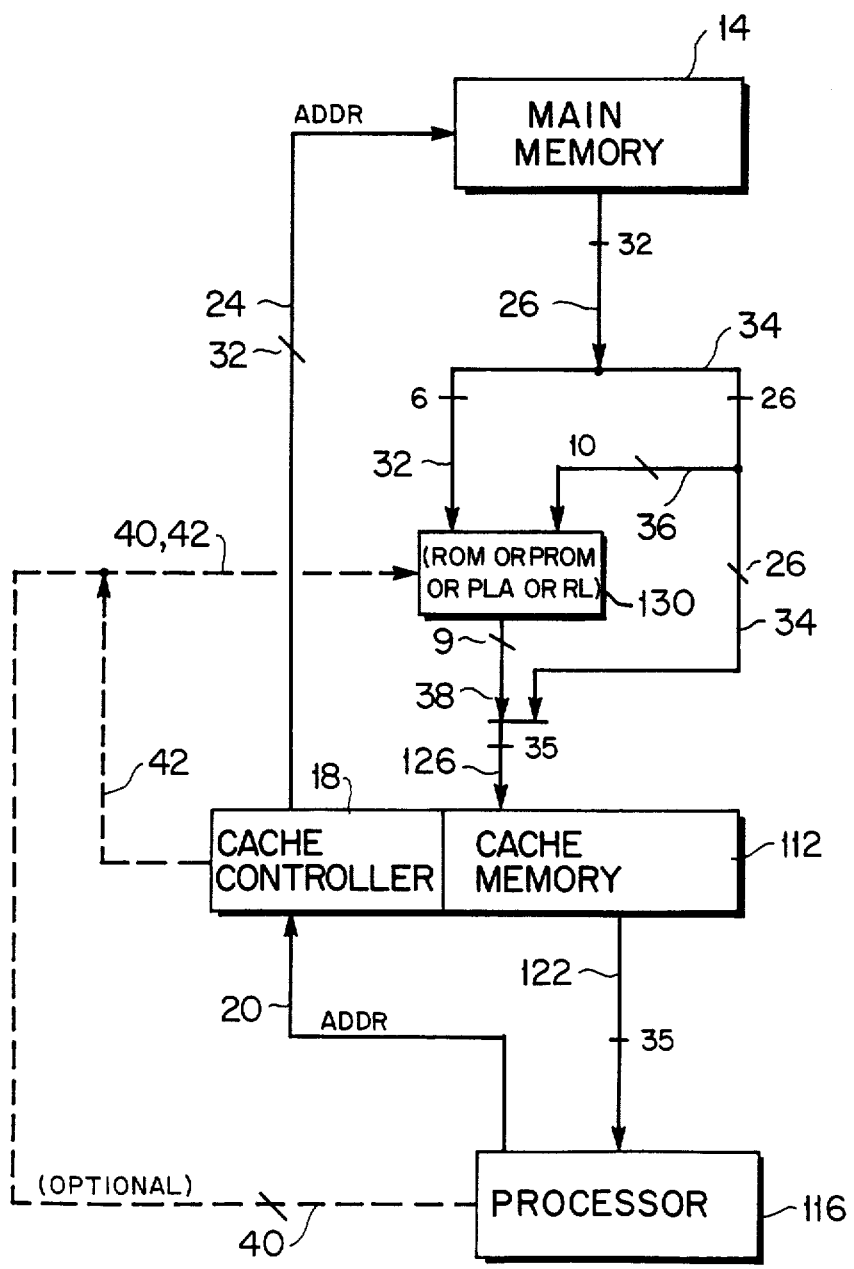
FIG. 3 is a block diagram illustrating another embodiment of a portion of a computer apparatus according to the invention.
Figure 4:
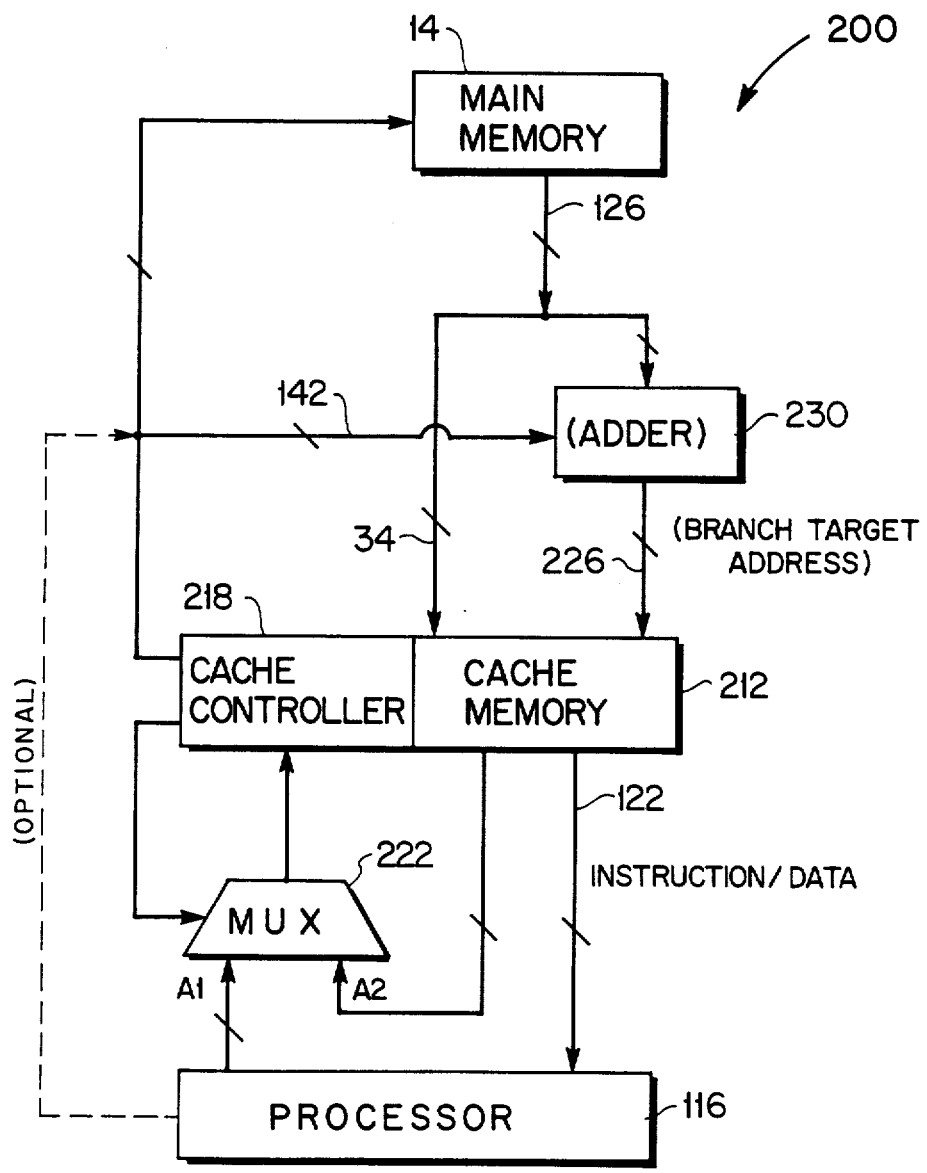
FIG. 4 is a block diagram illustrating still another embodiment of a portion of a computer apparatus according to the invention.

More specific examples of structures incorporating the invention are illustrated in FIG. 3 and in FIG. 4. Referring to FIG. 3 there is shown a portion of a computer system according to the invention wherein the logic element is an instruction predecoder 130. The instruction predecoder 130 may be embodied in any convenient form such as random logic, ROM, PROM, PAL or PLA. Because of the general nature of the concept of an instruction predecoder 130, there is no one form of which is best according to the invention. The structure thereof is essentially defined by the task to be performed and the technology selected for its implementation.

In the exemplary embodiment shown in FIG. 3, the main memory 14 provides as information unit lines a 32-bit wide instruction bus 26 which is separable into a 6-bit opcode path 32 and a 26-bit remainder path 34. The remainder path 34 is thus the instruction bus less opcode. Of the remainder path 34 there is a 10-bit set 36 which is routed in parallel to the instruction predecoder 130 and to the cache 112. The 10-bit set 36 is used to convey that portion of the instruction which is to be conveyed unaltered to the cache 112 but which is required for the predecoder 130. The predecoder 130 can be a simple PROM which in the present example reads out with a nine-bit dispatch address value in response to the sixteen bit instruction value received as an input.

A dispatch address bus 38 supplies nine bits in parallel with the remainder path 34 to provide a 35-bit wide information unit on data lines 126 to the cache 112. A matching 35-bit path 122 is provided between the cache 112 and the processor 116. In the present example, the nine-bit dispatch address portion of the path 122 is used to select a set of binary bit values representing signals which are wired directly to control points 51 of the processor 116.

The cache controller 18 is controlled by address lines 20 from the processor 116 and supervises transfer of data and instructions into and out of the cache 112. Addresses are directed to the main memory 14 via an address bus 24. Instruction select lines 40 and 42 may optionally be provided from the processor 116 and cache controller 18 to the precoder 130 so the predecoder can distinguish between instructions and data and can identify the type of instruction or data to expect from the main memory 14.

In operation, the predecoder 130 provides a portion of the functions previously performed by a processor. For example, the predecoder 130 may decode any of the opcodes patterns possible with six major opcode bits and ten auxiliary or subop bits into a set of nine binary valued signals which are stored as a portion of a 35-place binary valued word in the cache 112. The nine signals are of the type which can be executed directly by the processor 116 without further decoding, that is, the nine bits are used to select a set of binary bit values representing signals which directly drive control points 51 (e.g., FIG. 2) of the processor 116.

The predecoding operation has significant advantages since the instruction stored in the cache is typically retrieved numerous times once it has been stored in the cache 112. The conventional decoding step in the instruction execution process is reduced or eliminated, and some or all of the time required to perform the necessary decoding is absorbed in the cache miss operation (the operation whereby information not found in the cache 112 is fetched from the main memory 14).

In a specific embodiment, it is preferred that all instructions should be of the same length in order to facilitate rapid decoding. To facilitate all instruction word widths, the cache 112 is widened to accommodate the width of the widest predecoded set of binary values and the balance of the instruction. In the embodiment of FIG. 3 it has been found that a modest increase in cache width of three bits (from 32 bits to 35 bits) resulted in a decrease in cycle time.

FIG. 4 illustrates another type of embodiment in accordance with the invention. In the embodiment of FIG. 4, the transformation is of the type which allows the precalculation of a target branch address of a branch instruction. An instruction typically comprises at least two parts, a fetch (retrieve) and an execute. The execute part of a branch instruction normally requires two steps. The first step is to determine by calculation the target branch address from the relative address information accompanying the branch opcode. The second step is to branch to the calculated address. This second execute step of a branch instruction is also the fetch part of its target instruction. In pipelined processing the fetch and execute parts of consecutive instructions are desirably overlapped to take full advantage of processor resources. A conventional branch instruction wastes time in a pipelined system because the processor must wait for completion of the first execute step (calculation of the branch target address) before starting the second execute step (fetching the information unit at the branch target address). This problem is solved in a structure as illustrated in FIG. 4.

Referring to FIG. 4, there is shown a portion of a computing system 200 with a main memory 14, a cache memory 212, associated cache controller 218 and processor 116. Interposed on data lines 126 and 226 between the main memory 14 and cache memory 212 is an instruction address calculator 230. In the case of branch instructions, the address calculator 230 is basically an adder which adds the instruction address from lines 142 to the displacement field of the branch instruction to obtain the address of the target instruction. In order to facilitate the processing of this branch instruction, a multiplexer (MUX) 222 is provided into the address input of the cache controller 218. The cache controller 218 supervises operation of the MUX 222 so that it can select to receive address information from either the processor 116 or from the cache memory 212. When information is retrieved in this way from the cache memory 212, the branch instruction fetched via lines 122 to the processor 116 carries with it the branch target address which has been precomputed by the instruction address calculator 230.

Figure 7:
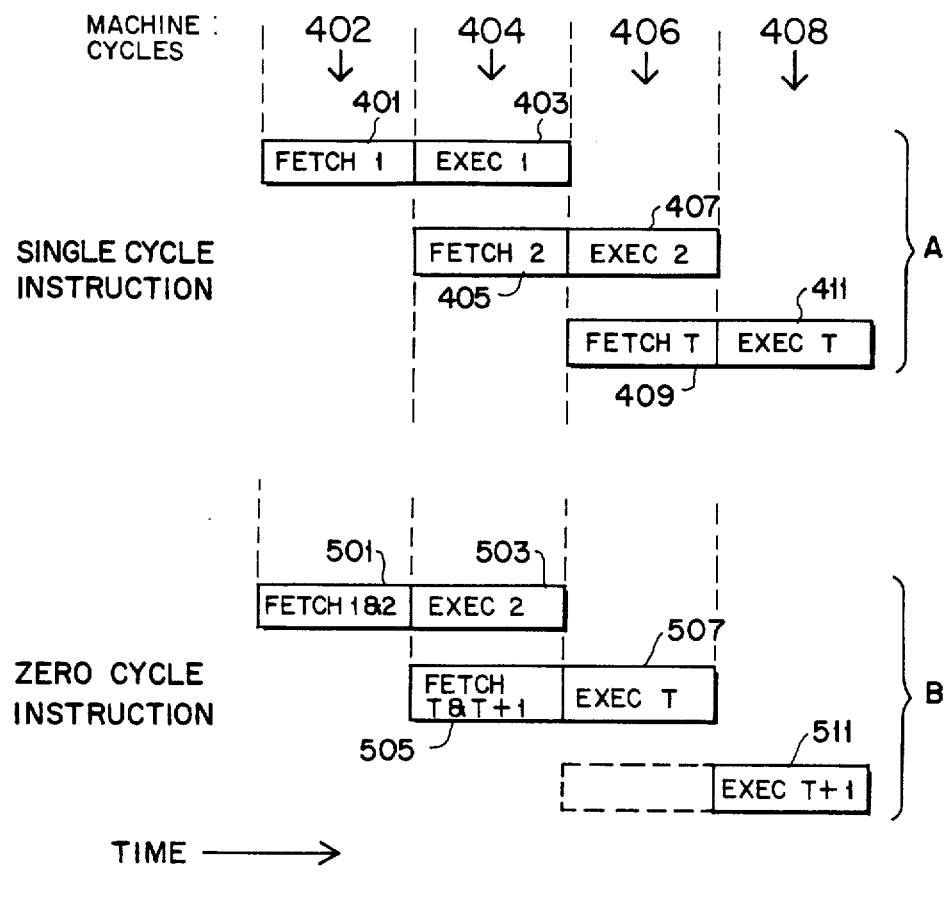
FIG. 7 is a timing diagram illustrating operation of zero cycle instructions.

FIG. 7 are machine cycle timing diagrams for showing two modes of operation for two different cases, namely the case of a branch instruction and the case of a format conversion instruction. Since the cases are substantially identical in principal, only the case of the branch instruction is explained.

Group A of FIG. 7 shows timing of an unenhanced branch instruction with delayed branching. A number of machine cycles 402, 404, 406 and 408 are illustrated. Each instruction comprises at least two stages, fetch stage and and execute stage, each stage occurring during a different machine cycle. During a first machine cycle 402, a fetch stage 401 of a first instruction (which in this case is a branch instruction) occurs. During the next machine cycle 404, an execution stage 403 of the first instruction occurs simultaneously with the fetch stage 405 of a second instruction (which in this case is a delay instruction). Since the execution stage 403 of the first instruction computes the branch target address, the third instruction (in this case an instruction at the branch target address) can only be fetched during machine cycle 406 and thereupon executed during the execute stage 411 in the machine cycle 408.

If the architecture of the computer processor is defined without a delayed branch capacity, then the fetch stage 409 of the target instruction cannot occur during machine cycle 404, thus requiring that there be a pipe interlock cycle wherein no execute stage can be performed in machine cycle 406. However, according to the present invention, even if the architecture does not define a delayed branch capacity, then fetch stage 409 of the target instruction can occur during the machine cycle 404 because the branch target address has been precomputed and stored in cache.

Group B of FIG. 7 shows timing of a zero-cycle branch instruction according to the invention, if delayed branching is defined in the computer architecture. During a first machine cycle 402, the first and second instructions are both simultaneously fetched (which in this case is a branch instruction and its associated delay instruction) during fetch stage 501. During the next machine cycle 404, the execute stage 503 of the second instruction (which in this case is the delay instruction) occurs simultaneously with the fetch stage 505 of the third and fourth instructions (which in this case are an instruction at the branch target address and an instruction at the address following the branch target address). Since the execution stage 503 in machine cycle 404 need not be used to obtain the branch target address, the third instruction (in this case an instruction at the branch target address) can be fetched in the same machine cycle and executed during the next machine cycle 406, and the next instruction can be executed during machine cycle 408. A comparison of Group A and Group B reveals there is a net savings in time of one machine cycle.

The difference is that in the normal operation with the cache, only one instruction is fetched at a time, whereas in the zero cycle branch instruction, there must be a mechanism for fetching two consecutive instructions. A structure accommodating a mechanism for fetching two instructions has been shown generally in FIG. 2 wherein IR1 44 and IR2 46 receive information units simultaneously from the cache 112. Precisely this structure is contemplated in the embodiment of FIG. 4 in which the zero cycle branch instruction is implemented. Whereas in the normal cycle, the processor 116 would fetch instruction number one and thereafter execute instruction number one while fetching instruction number two and thereafter execute instruction two, while fetching instruction number three and so on, in the zero cycle branch instruction, the processor 116 would fetch instruction number one and number two simultaneously and if it is an appropriate instruction, it would execute instruction number two while fetching the target of the branch, which would be instruction number one, and thereafter the processor would execute the target of the branch.

In a pipeline processor, this technique would save machine cycles as compared to the conventional branch instruction technique. As shown in FIG. 7, over a period of three machines cycles, the processor would effectively execute four instructions, including a branch instruction, which effectively executes in zero cycles. The same process could apply to data transformation instructions if data is transformed on loading the cache memory from the main memory. One constraint on the design of the instruction set associated with this capability is as follows: The branch must be relative to the address of the branch instruction and not relative to the program counter. A computing machine which employs delayed branches does not necessarily provide that the current contents of the program counter (not shown) be the same as the address of the branch instruction.

Figure 5:
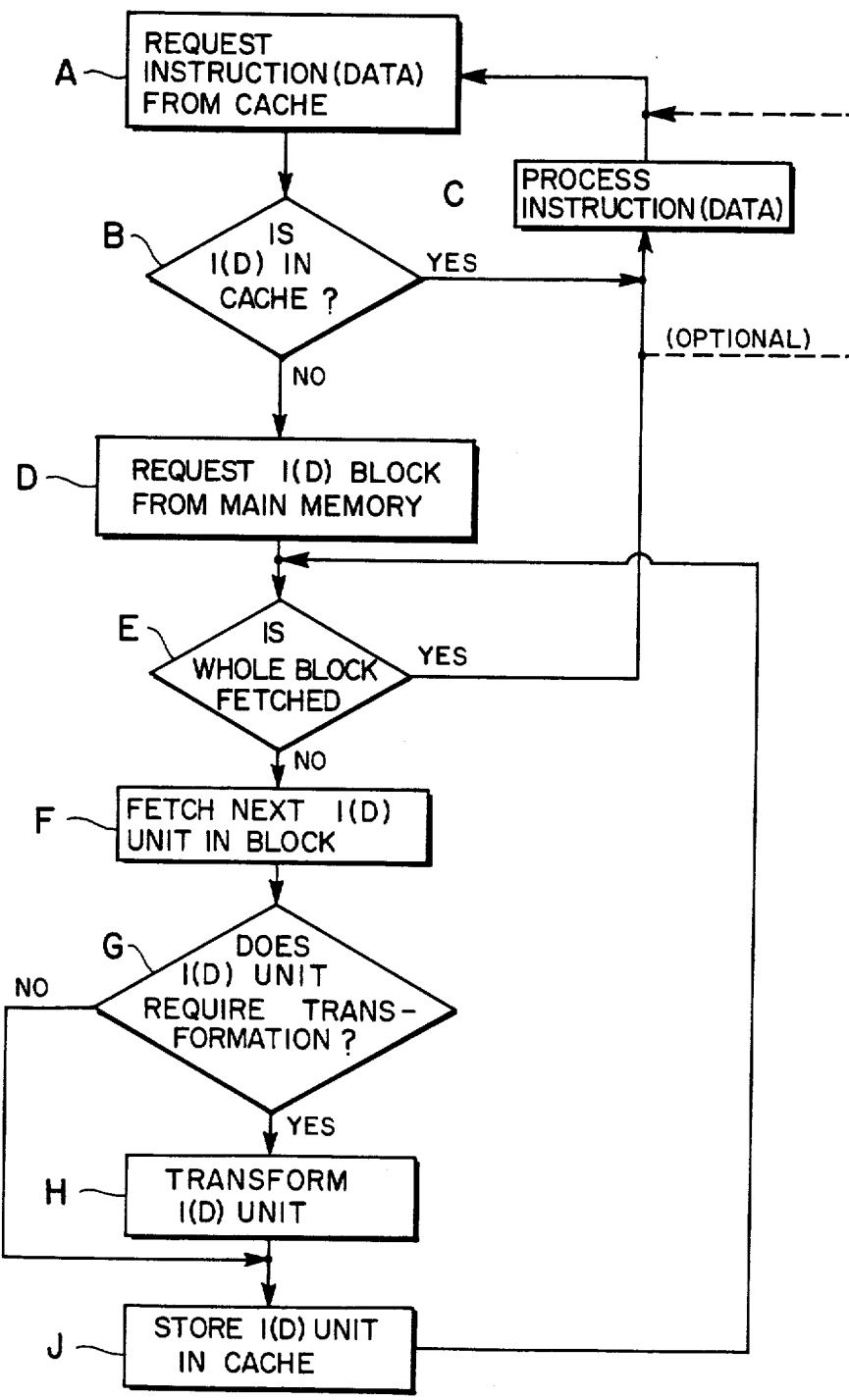
FIG. 5 is a flow chart illustrating a method according to the invention.

Referring now to FIG. 5, there is shown a flow chart for a generalized method in accordance with the invention. It is presumed that the step of deciding whether the information unit is instruction or data has already been made. In FIG. 5, therefore, the first step is for the processor 116 (FIG. 2 for generalized reference purposes) to fetch, that is, to request an instruction or a unit of data from the cache 112 (Step A). The cache controller 18 determines whether the requested instruction or data unit is in the cache memory 112 (Step B). If it is, then it is passed to the processor 116 and processed (Step C). The operation is then ready to start again (Step A). If the instruction or data unit is not in the cache 112, then the cache controller 18 requests that block of information units from the main memory 14 known (from the address request) to contain the originally requested information unit (Step D). The cache controller 18 monitors the transfer from the main memory 14 to the cache memory 112 until the whole block has been stored and if necessary processed (Step E). The cache controller 18 causes the transfer of each information unit (data or instruction as the case may be) from the main memory 14 to the cache memory 112 (Step F) and determines for each information unit whether the unit requires transformation (Step G). If it does not require transformation the cache controller 18 stores the information unit in the cache memory 112 (Step J) and goes on to determine if the whole block has been transferred (Step E). If the information unit requires transformation, then according to the invention the information unit is transformed, that is, an instruction is predecoded, the target branch address of a branch instruction is precomputed or other predefined preprocessing of a data unit or an instruction is carried out (Step H). The resultant transformed information unit is stored in the cache memory 112 (Step J), and the cache controller checks to see if the whole block has been stored (Step E). Once the whole block has been stored, the originally requested information unit which has been stored in the cache memory 112 can now be processed under control of the processor 116 (Step C).

Figure 6:
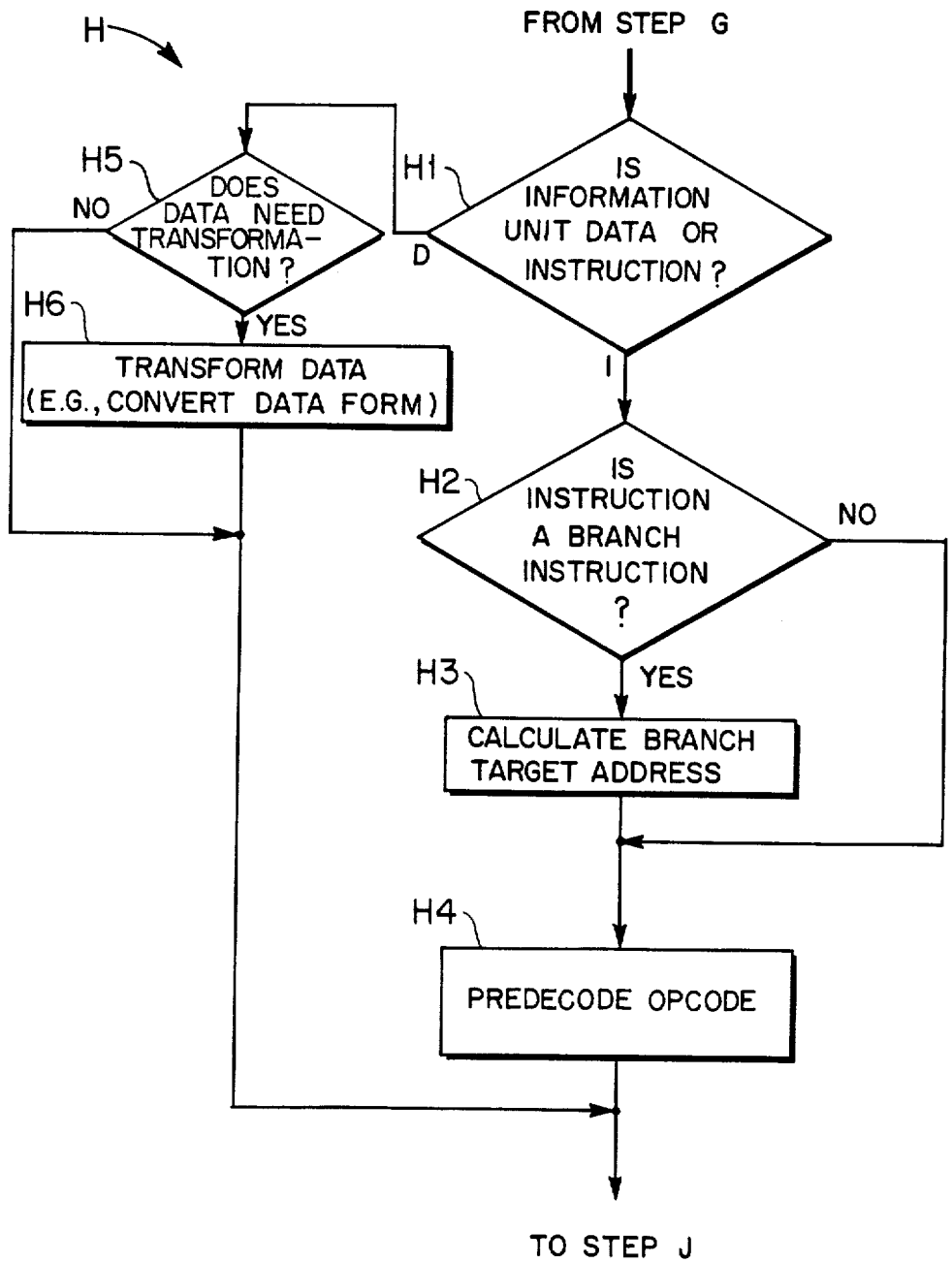
FIG. 6 is a flow chart illustrating further details of a method according to the invention.

FIG. 6 is a flow chart illustrating further details of optional steps at the position of Step H, depending on the architecture of the particular computer. If there is a capability of handling both data and instruction information units in the cache, it is necessary to distinguish between data and instructions (Step H1). If the information unit is data, then it must be determined whether the data needs to be transformed (Step H5), and then the data transformation step or steps are performed (Step H6), such as converting data format. If it is an instruction, then the type of instruction must be identified, as for example whether the instruction is a branch instruction (Step H2). If it is a branch instruction, then the logic element, typically an adder (element 230 of FIG. 4) calculates the branch target address (Step H3). In each case where predecoding is desired, the instruction is at least partially decoded into a set of binary values representing control point signals for the processor (Step H4). The process then continues as previously described with the next step (Step J).

The invention has now been explained with reference to specific embodiments. Other embodiments should be apparent to those of skill in the art of computer architecture design. It is therefore not intended that this invention be limited except as indicated by the appended claims.

We claim:

1. In a computer, an improvement for facilitating processing of an instruction in a processor having associated therewith a main memory and a cache memory, the cache memory, the cache memory for receiving information units stored in the main memory in order to make said information units more readily available for use by the processor, the improvement comprising:
   cache control means coupled to the processor and to the cache memory for requesting at least one unit of information from the main memory; and
   means coupled to receive information units from the main memory for transforming at least a portion of said at least one information unit to produce at least one transformed unit of information and for directing said at least one transformed unit for storage in the cache memory for potential use by the processor, wherein said transforming means comprises means identifying whether said at least one unit is a branch instruction and calculating with said transformation element a branch target address.

2. The improvement according to claim 1 wherein said transforming and directing means is a memory means.

3. The improvement according to claim 1 wherein said transforming means is an adding means.

4. The improvement according to claim 1 wherein said transforming means comprises means for treating said at least one unit of information as an instruction and processing at least a portion of said instruction to produce an intermediately decoded instruction as said transformed unit for storing in said cache memory.

5. The improvement according to claim 1 wherein said cache memory is capable of storing both instructions and data units and said transforming means is capable of distinguishing between an instruction or data.

6. The improvement according to claim 1 wherein said inforamtion unit is data and wherein said transforming means comprises means for converting format of data to produce said transformed unit.

7. The improvement according to claim 1 wherein said cache memory is an instruction cache and wherein said unit of information is an instruction.

8. The improvement according to claim 1 wherein said processor includes means for requesting and storing simultaneously a minimum of two units of information from the cache memory.

9. The improvement according to claim 1 wherein said transforming and directing means is a logic means.

10. In a computer, a method for facilitating processing of an instruction in a processor having associated therewith a main memory and a cache memory, the cache memory for receiving information units stored in the main memory for order to make said information units more readily available for use by the processor, the method comprising: requesting at least one unit of information from the main memory by the processor;
    transforming at least a portion of said at least one unit with a transformation element to produce at least one transformed unit of information, wherein said transforming step comprises identifying whether said at least one unit is a branch instruction; and calculating with said transformation element a branch target address; and
    storing said at least one transformed unit in the cache memory for potential use by the processor.

11. The method according to claim 10 wherein said cache memory is a cache memory capable of storing both instructions and data units, said method further including the step of distinguishing whether said at least one unit is an instruction or a data unit.

12. The method according to claim 10 wherein said cache memory is an instruction cache and wherein said unit of information is an instruction.

13. In a computer, a method for facilitating processing of an instruction in a processor having associated therewith a main memory and a cache memory, the cache memory for receiving information units stored in the main memory in order to make said information units more readily available for use by the processor, the method comprising:
    requesting at least one unit of information from the main memory by the processor;
    transforming at least a portion of said at least one unit with a transformation element to produce at least one transformed unit of information, wherein said information unit is data and wherein said transforming step comprises converting format of data to produce said transformed unit; and
    storing said at least one transformed unit in the cache memory for potential use by the processor.

14. In a computer, a method for facilitating processing of an instruction in a processor having associated therewith a main memory and a cache memory, the cache memory for receiving information unit stored in the main memory in order to make said information units more readily available for use by the processor, the method comprising:
    requesting at least one unit of information to the cache memory from the main memory;
    transforming at least a portion of said at least one unit with a transformation element to produce at least one transformed unit of information; thereafter
    requesting by the processor a minimum of a first unit of information from the cache memory to the processor and a second unit of information from the cache memory to the processor, said first unit of the information being of the type requiring no further transformation, and wherein said first unit of information and said second unit of information each comprise a separate instruction to said processor, each said instruction being executable by said processor during at least one cycle of said processor, and wherein processing of each said instruction has at least a fetch stage and an execution stage, said execution stage following said fetch stage;
    fetching by the processor said first instruction and said instruction in a first fetch stage during a first processor cycle; and
    executing by the processor said second instruction in a first execution stage during a second processor cycle, while during said second processor cycle also fetching by said processor a third instruction in a second fetch stage such that a result is produced that for at least one instruction an effective zero cycle execution time elapses as compared with an instruction which has not undergone said transforming step.

15. The method according to claim 14 wherein said first instruction is a branch instruction.

16. The method according to claim 14 wherein said first instruction is a format conversion instruction.

17. In a computer, a method for facilitating processing of an instruction in a processor having associated therewith a main memory and a cache memory, the cache memory for receiving information units stored in the main memory in order to make said information units more readily available for use by the processor, the method comprising:
    requesting at least one unit of information to the cache memory from the main memory;
    transforming at least a portion of said at least one unit with a transformation element to produce at least one transformed unit of information; thereafter
    requesting by the processor a minimum of a first unit of information from the cache memory to the processor and a second unit of information from the cache memory to the processor, said first unit of the information being of the type requiring no further transformation, and wherein said first unit of information and said second unit of information each comprise a separate instruction to said processor, said second instruction being a delay instruction, each said instruction being executable by said processor during at least one cycle of said processor, and wherein procesing of each said isntruction has at least a fetch stage and an execution stage, said execution stage following said fetch stage;
    fetching by the processor said first instruction and said instruction in a first fetch stage during a first processor cycle; then
    executing by the processor said second instruction in a first execution stage during a second processor cycle, while during said second processor cycle also fetching by said processor a target information unit; and then fetching by the processor a third instruction relative to an address of said target information unit while executing said target information unit at said target address such that a result is produced that for at least one instruction an effective zero cycle execution time elapses as compared with an instruction which has not undergone said transforming step.

18. In a computer, a method for facilitating processing of an instruction in a processor having associated therewith a main memory and a cache memory, the cache memory for receiving information units stored in the main memory in order to make said information units more readily available for use by the processor, the method comprising:

requesting at least one unit of information to the cache memory from the main memory;

transforming at least a portion of said at least one unit with a transformation element to produce at least one transformed unit of information; thereafter requesting by the processor a minimum of a first unit of information from the cache memory to th e processor and a second unit of information from the cache memory to the processor, said first unit of the information being of the type requiring no further transformation, and wherein said first unit of information and said second unit of information each comprise a separate instruction to said processor, said first instruction being a branch instruction having a predecoded branch target address and said second instruction being a delay instruction, each said instruction being executable by said processor during at least one cycle of said processor, and wherein processing of each said instruction has at least a fetch stage and an execution stage, said execution stage following said fetch stage;

fetching by the processor said first instruction and said second instruction in a first fetch stage during a first processor cycle; then executing by the processor said second instruction in a first execution stage during a second processor cycle, w hile during said second processor cycle also fetching by said processor a third instruction relative to an address of said target instruction; and then executing by the processor said target instruction at said target address in said during said second processor cycle while during said second processor cycle fetching a fourth instruction b y said processor such that a result is produced that for at least one instruction an effective zero cycle execution time elapses as compared with an instruction which has not undergone said transforming step.

* * * * *